United States Patent [19]

Leiber

[11] Patent Number: 4,890,891
[45] Date of Patent: Jan. 2, 1990

[54] ANTILOCK SYSTEM FOR A ROAD VEHICLE

[75] Inventor: Heinz Leiber, Oberriexingen, Fed. Rep. of Germany

[73] Assignee: Daimler-Benz Aktiengesellschaft, Stuttgart, Fed. Rep. of Germany

[21] Appl. No.: 116,867

[22] Filed: Nov. 5, 1987

[30] Foreign Application Priority Data

Nov. 6, 1986 [DE] Fed. Rep. of Germany ....... 3637781

[51] Int. Cl.$^4$ .............................. B60T 8/42; B60T 8/88
[52] U.S. Cl. .................................... 303/115; 303/92; 303/116
[58] Field of Search ................ 188/181 A; 303/59–61, 303/92, 93, 100, 113, 114, 115, 116, 117, 119

[56] References Cited

U.S. PATENT DOCUMENTS

| | | | |
|---|---|---|---|
| 3,666,328 | 5/1972 | Williams | 303/115 |
| 3,671,085 | 6/1972 | Pasek et al. | 303/115 |
| 3,747,990 | 7/1973 | Tanguy | 303/92 |
| 3,810,682 | 5/1974 | Demers et al. | 303/115 |
| 3,877,759 | 4/1975 | Sekiguchi et al. | 303/115 |
| 3,905,654 | 9/1975 | Tribe | 303/92 |
| 4,050,748 | 9/1977 | Belart | 303/115 X |
| 4,175,794 | 11/1979 | Pauwels | 303/119 X |
| 4,484,784 | 11/1984 | Leiber | 303/119 X |
| 4,775,196 | 10/1988 | Braschel et al. | 303/119 X |

FOREIGN PATENT DOCUMENTS

| | | | |
|---|---|---|---|
| 0063748 | 12/1973 | Australia | 303/93 |
| 3237792 | 10/1982 | Fed. Rep. of Germany | |
| 0071360 | 4/1985 | Japan | 303/115 |

OTHER PUBLICATIONS

ALB Anti-Blockier-System Honda Deutschland GmbH, 1983.

*Primary Examiner*—Andres Kashnikow
*Assistant Examiner*—Timothy Newholm

[57] ABSTRACT

An antilock brake system includes a pressure modulator having a step piston. The smaller step defines a primary chamber connected to the wheel brake and the larger piston step defines a driving pressure space that is alternatively connected to the high pressure output of an auxiliary pressure source or to its unpressurized storage reservoir by a control valve. By the admission of pressure to the driving pressure space, the modulator piston, against the restoring force of a strong restoring spring, is forced into its initial position corresponding to the minimum volume of the primary chamber. For a pressure reduction phase, the driving pressure space is connected with the storage reservoir of the auxiliary pressure source, so that, under the combined effect of the brake pressure in the primary chamber and of the restoring spring, the piston moves to expand the volume of the primary chamber. The pressure buildup phases are controlled by the readmission of the output pressure of the auxiliary pressure source to the driving pressure space. The maximum volume expansion of the primary pressure space is smaller than the brake fluid volume that, during a braking taking place with maximum actuating force, can be displaced into the wheel brakes. This avoids the brake unit from becoming "controlled empty" in the case of very low adhesion coefficients between the road and the vehicle wheels.

20 Claims, 5 Drawing Sheets

ANTILOCK SYSTEM FOR A ROAD VEHICLE

BACKGROUND AND SUMMARY OF THE INVENTION

The invention relates to an antilock system for a road vehicle having a hydraulic multiple circuit brake system, particularly a dual circuit brake system, the wheel brake cylinder of which can be acted upon by a pressure that is generated in an output pressure space of a brake unit, such as a tandem master cylinder, and that is proportional to the actuating force. An antilock system of this type is known on the basis of Honda publication, *ALB, Antilock System*, which is an information bulletin of Honda Deutschland GmbH, February 1983.

In known antilock systems, a pressure modulator is assigned to each wheel brake that can be controlled. The pressure modulator is connected by a control valve to a hydraulic auxiliary pressure source, or to an unpressurized storage reservoir of the auxiliary pressure source, to control the brake pressure reduction or brake pressure build-up phases that are required in the course of an antilock control cycle.

Each of the pressure modulators consists of an elongated, cylindrical housing that is closed off by end face walls and of a modulator piston that can be slid back and forth in this housing. This modulator piston comprises a primary flange and a secondary flange that are connected with one another by a piston rod of a smaller diameter which, in a pressure-sealed way, passes through a central bore of a partition wall of the modulator housing. The partition wall, together with the piston rod, form a fixed wall defining and separating two housing chambers while another wall, of the housing chambers, is defined by the movable primary flange and the secondary flange of the modulator piston respectively. One—annulus-shaped—chamber of the pressure modulator, which is movably defined by the primary flange of the modulator piston, is the output pressure space of the pressure modulator and is connected to the wheel brake cylinder of the respective wheel brake. The other—also annulus-shaped—chamber, which is movably defined by the secondary piston, is connected with the output pressure space of the brake pressure control unit, such as a tandem master cylinder.

The primary piston and the adjacent end face wall of the modulator housing define an after-running space which is connected to the brake fluid reservoir of the brake system. The secondary piston and the adjacent end face wall of the modulator housing define a driving, or control pressure space, that can be connected alternatively to the high pressure output of the auxiliary pressure source or to its unpressurized storage reservoir, by a regulating control from magnetic valves. The modulator piston is forced into its basic position by pretensioned return springs one is between the partition wall and the primary flange and the other which acts upon the secondary flange, is adjacent the end face wall of the housing. The basic position corresponds to the maximum volume of the output pressure space of the modulator in which the primary flange engages the adjacent end face wall of the modulator housing. Within this basic position, and a small portion of the overall stroke of the modulator piston, a valve is opened to permit compensating flow between the output pressure space and the after-running space of the pressure modulator.

The output pressure of the brake pressure control device in the control annulus during a braking operation, shifts the modulator piston to reduce an output pressure space, whereby, in the connected wheel brake cylinder, a corresponding brake pressure is built up. If a locking tendency occurs at the braked wheel, the driving pressure space, that until then had been kept in an unpressurized condition, is connected to the high-pressure output of the auxiliary pressure source, thereby shifting the piston of the pressure modulator to enlarge its output pressure space and thus reduce the brake pressure in the connected wheel brake cylinder. A brake fluid volume that corresponds to the volume enlargement of the output pressure space is, at the same time, pumped back from the control annulus into the brake pressure control device. If the locking tendency at the controlled wheel decreases again, so that the brake pressure can be built up again, the driving pressure space is blocked with respect to the auxiliary pressure source and connected with its unpressurized storage reservoir. The output pressure of the brake pressure control device that exists in the control chamber then causes a shifting of the modulator piston to reduce the output pressure space and thus increase the brake pressure in the wheel brake cylinder.

The known antilock system has at least the following disadvantages:

Since, during each pressure reduction phase, the piston of the pressure modulator must be shifted against the output pressure of the brake pressure control device that exists in its control pressure space, the pressure reduction speed is always the lowest when the brake pressure that exists at the start of a control process is particularly high. This naturally is unfavorable for the effectiveness of the antilock control. This disadvantage could be at least partially compensated by the fact that the auxiliary pressure source is designed for a particularly high output pressure level and/or that the surface of the secondary piston acting on the driving pressure space side is much larger than its effective piston surface that defines the control pressure space. This would result in unfavorable dimensions of the pressure modulator as a whole.

In addition, during each pressure reduction phase, a brake fluid volume, that corresponds to the volume enlargement of the output pressure space of the pressure modulator, is pumped back into brake pressure control device. Even if this volume is relatively low, a considerable pedal reaction will occur, pushing-back the brake pedal for a pressure reduction process and release the pedal for a pressure buildup phase. The pedal reaction intensity is at least unpleasant for the driver, even in cases where, because of his experience, he knows that this brake pedal reaction is an indication of the proper functioning of the antilock system. After an extended pressure reduction phase, in the course of which the brake pedal was pushed back practically to its initial position, another pressure buildup phase will follow that leads to the adjusting control of the maximum brake pressure. Thus occurs for example, when the control starts in a roadway area with a very low adhesion coefficient between it and the braked vehicle wheels and the vehicle then again reaches a roadway area with a very high adhesion coefficient. The drastic release of the brake pedal that occurs in this type of a situation and is connected to the brake pressure buildup, may be interpreted by the driver as a defect, such as a leak in the brake system in one of the brake circuits. The clearly noticeable pedal reaction that is connected with a response of the control and that is desirable in other respects, therefore, in a statistically significant number of braking situations, cannot be interpreted clearly and is therefore able to simulate a situation of potential danger which may confuse a driver who is familiar with the operation of a vehicle brake system.

It is therefore the objective of the invention to improve an antilock system wherein in the case of high brake Pressures, an increased brake pressure reduction speed is also ensured, and, in the case of a response of the control, confusing brake pedal reactions are avoided.

This objective is achieved as follows.

For normal brake operation, a step modulator piston is forced into its initial position and held against the effect of a strong return spring, by of the admission of output pressure of the auxiliary pressure source to the driving pressure space a minimal volume of its output pressure space that is connected with the brake circuit that can be subjected to the control. When the antilock control responds, a favorably high pressure reduction speed is achieved, since the brake pressure existing in the output pressure space of the pressure modulator, as well as the—maximal—pretensioning of the return spring, act in the same direction in the sense of an enlargement of the volume of the output pressure space of the pressure modulator for a reduction of the pressure in the wheel brake cylinder that is connected to it.

Since, moving of the piston from its initial position closes the intake valve, connecting the brake pressure control device with the primary chamber of the modulator, there is at first no effect on the brake unit and therefore also no pedal reaction in the sense of a pushing-back of the brake pedal in the direction of its initial position. A pedal reaction of this type will occur only when the piston reaches its the final position that corresponds to a maximum volume of the output pressure chamber and the brake pressure was not thereby sufficiently reduced. The pressure modulator must also be switched over to "recirculating operation", in which case the intake valve, because the pressure in the primary chamber of the pressure modulator is higher than in the output pressure space of the brake pressure control device, returns into its open position that permits the recirculating operation. Thus the brake pressure can be reduced sufficiently before the next retraction stroke of the pressure modulator piston. An effect of a brake pressure reduction control phase that is noticeable at the brake pedal will therefore occur only when a drastic reduction in the wheel brake cylinder or wheel brake cylinders, that are subjected to the control is required, and only to a "moderate" degree that corresponds to the reduction of a residual brake pressure. The pedal reaction that occurs upon a response of the antilock control to a drastic brake pressure reduction remains within a range that the driver by no means would consider as being "alarming". Therefore, when, a moderate pressure reduction is sufficient for the suppression of a locking tendency of a braked vehicle wheel, the volume expansion of the output pressure space of the modulator causes no pedal reaction. When a high pressure reduction is required by recirculating of brake fluid into the brake pressure control device, it is ensured by this operating mode that the output pressure space of the brake pressure control device cannot be "controlled to be empty". Also, if the auxiliary pressure supply breaks down, sufficient brake fluid always remains in the connected brake circuit in order to be able to continuously build up brake pressure in the connected wheel brake or wheel brakes by actuating the brake pressure control device.

By the dimensioning of the volume increase of the primary chamber of pressure modulator to be less than the maximum brake fluid volume, the response of the control at those wheel brakes at which the brake pressure is controlled by the pressure modulator, does not lead to a pedal reaction in a majority of braking situations. The occurrence of a significant pedal reaction is limited to that small number of cases in which, starting from a high initial brake pressure, this brake pressure must be lowered drastically, i.e., those braking situations which must be advantageously indicated to the driver as being situations of potential danger.

A bypass valve that opens when the piston of the pressure modulator reaches its position of maximum volume of its output pressure space, ensures that, in the case of a breakdown of the auxiliary pressure source, brake pressure—with a prolonged pedal path—can continuously be built up by actuating the brake pressure control device.

Simple and operationally reliable structure of the bypass valve of the pressure modulator that can be implemented as an alternative or in combination include a spring load closing element related to the step piston.

With a pressure modulator having dual driving pressure spaces and appropriate valves as an alternative to the afore-mentioned development, no lengthening of the pedal path occurs in the case of a breakdown of the auxiliary pressure source. Also a bypass valve is not required in order to ensure the operability of the brake system when the auxiliary pressure source breaks down.

The output signal of an electromechanical position indicator may be utilized in many ways, for example, for the recognition of a breakdown of the auxiliary pressure source and/or for the determination of the pressure reduction speed in a corresponding control phase of the antilock system. A signal, that represents a measurement of this pressure reduction speed, can be obtained by the time-related differentiation of the output signal of the position indicator. Using the position output signal of the position indicator, "recirculating pumping motions" of the pressure modulator piston may also be controlled in an appropriate way. This also applies to the control of pressure buildup phases of the antilock control.

In order to be able to obtain a position signal that has a sufficiently low error, the modulator piston includes a conical shell surface that tapers in the axial direction with a pin that rides on the surface and moves radially. This provides the advantage that the annulus, that is conical on the interior and remains between the piston, flanges of the modulator piston can be utilized as an unpressurized separating space. If necessary, this space provides an effective hydraulic separation of the pressure media of the brake circuit and that of the hydraulic driving circuit that may differ with respect to their physical-chemical structure. The driving circuit of the pressure modulator may then be operated by a conventional hydraulic oil. Thus it becomes possible to utilize as the auxiliary pressure source, a pressure supply unit that is provided at the vehicle for other purposes and that is equipped, for example, with a pump that is permanently driven by the engine of the vehicle and that—because of the permanent drive—must be operated with a hydraulic medium of high lubricity.

By using a check valve for the intake valve of the pressure modulator, the recirculating pumping function for the connected brake circuit is achieved in a simple way. In the recirculating operation of the pressure modulator, brake pressure control valves, assigned individually to the wheels brakes, are controlled into their blocking positions.

By using a check valve between the control valve and the auxiliary pressure source, the modulator piston, also in the case of a temporary switching-off or a breakdown of the auxiliary pressure source for a minimum duration, remains in its position that is connected with the minimum volume of the primary chamber of the pressure modulator. In this case, if an electrically operated pressure supply pump is provided, a protective operation of that pump, in intervals, is possible in response to output signals of the position indicator.

In the case of a breakdown of the auxiliary pressure source that can be recognized by a position output signal of the position indicator, characteristic of a receding of the pressure modulator piston, the control valve is moved to its position allowing volume enlargement of the primary chamber to ensure that braking can take place with a sufficient braking deceleration while the pedal path is prolonged. In which case, the pressure maintaining phases of the antilock control continue to be possible, but with no pressure reduction phases of that antilock control.

With the use of a second restoring spring, a measuring of the pressure in the driving pressure space of the pressure modulator by the position indicator is possible. Thus in an uncomplicated way, a feeding of pressure into this driving pressure space can be controlled according to the requirements.

By forming the piston in two parts, a position indicator that monitors the piston position can be utilized for measuring the pressure in the primary chamber of the pressure modulator, i.e., for measuring the brake pressure directed into the connected wheel brakes. This brake pressure information can also be used for a control of the antilock control cycles according to the requirements.

By designing the auxiliary pressure source with an overflow valve, also controlled by the position of the piston, in such a constructively uncomplicated way that it may be integrated into the pressure modulator, an overall high operational reliability of the antilock system according to the invention is achieved.

By apportioning pressure in the first pressure buildup phase that follows a pressure reduction phase of the antilock control as a function of the previous pressure reduction, a fast adaptation of the brake pressure to the respective most favorable value is achieved. As a result, a considerable gain is achieved in brake deceleration as well as in directional control.

The control signals, that in this case are required for the control of the antilock system control valve arrangement, may be obtained in a simple way from processing the position signals to determine pressure reduction.

By using a throttle in the control circuit of the pressure modulator, it is possible to place the variation rates of the brake pressures in the pressure reduction and pressure buildup phases of the antilock control, in an optimal relationship with respect to one another.

Other objects, features and advantages of the present invention will become more apparent from the following description when taking with the accompanying drawings which show, for purposes of illustration only, an embodiment in accordance with the present invention.

DETAILED DESCRIPTION OF THE DRAWINGS

Figure 1:
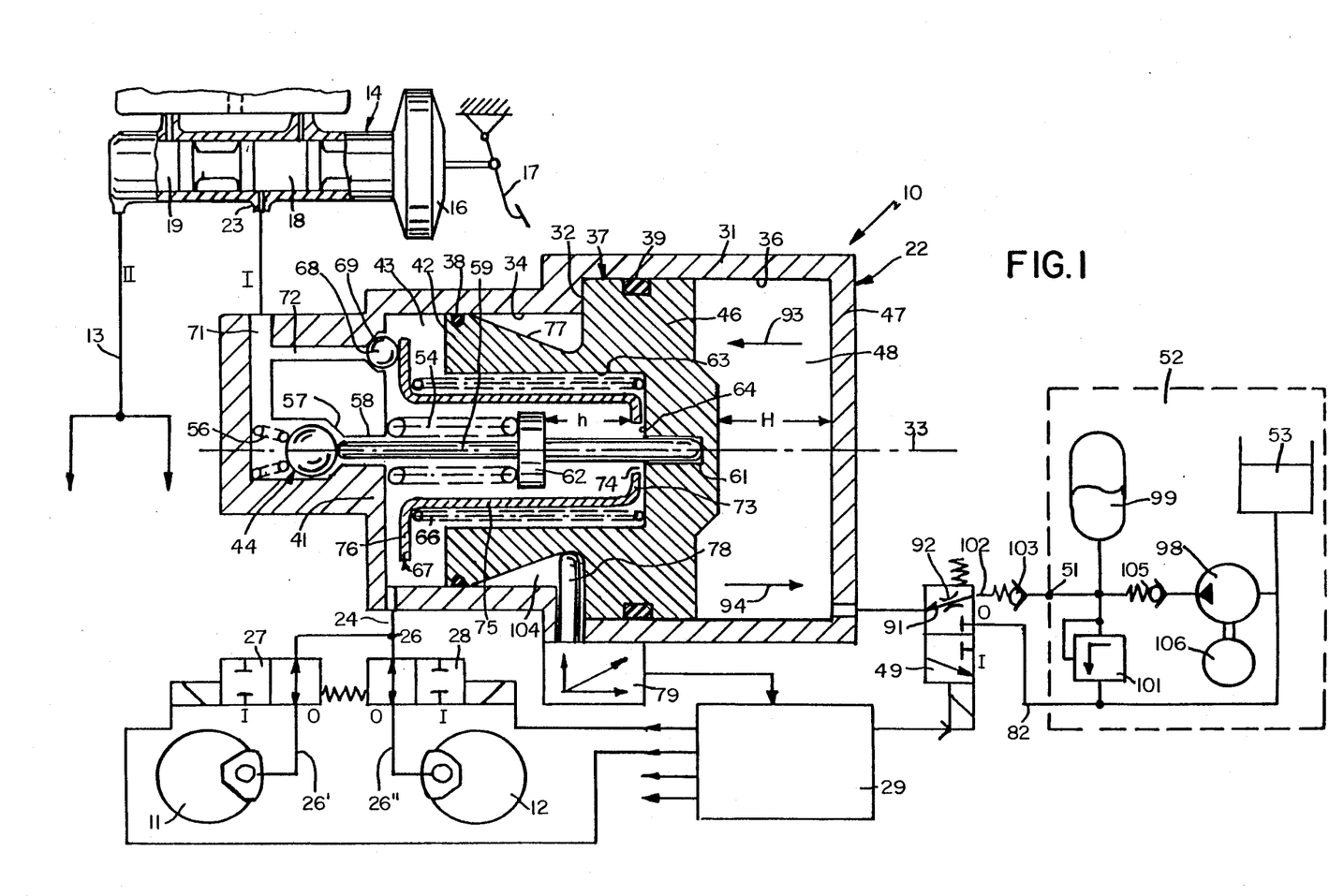
FIG. 1 is a simplified block diagram of a first embodiment of the antilock system according to the invention for a vehicle with a hydraulic dual circuit brake system, with a cross-sectional view of a pressure modulator along its central axis, provided for the brake pressure control at the wheel brakes of the front axle.

FIG. 1 shows the operationally significant components of an antilock system 10, for a road vehicle with a hydraulic dual circuit brake system. The front wheel brakes 11 and 12 are combined in a front axle brake circuit I, and the rear wheel brakes—that for reasons of simplicity are not shown—are combined in a rear axle brake circuit II. This rear axle brake circuit II is represented only by its master brake line 13 that branches out in the direction of the rear wheel brakes. It is a prerequisite that the brake circuits I and II are so-called static brake circuits. In the case of the shown special embodiment, a tandem master cylinder 14 of conventional construction is provided as the brake unit. This tandem master cylinder 14 can be actuated via a brake booster 16, such as a vacuum brake booster, by a brake pedal 17. In the case, the front axle brake circuit I is connected to the primary output pressure space 18, and the rear axle brake circuit II is connected to the secondary output pressure space 19 of the tandem master cylinder 14.

It is a further prerequisite of the antilock system that it operates the rear axle brake circuit II according to the known recirculating principle, according to which, during pressure reduction phases of the antilock control, brake fluid is pumped back from the wheel brake(s) subjected to the control and into the secondary output pressure space 19 of the brake unit, according to another known principle, to provide an acknowledgment at the brake pedal 17 that is appropriate for the response of the control.

Figure 3:
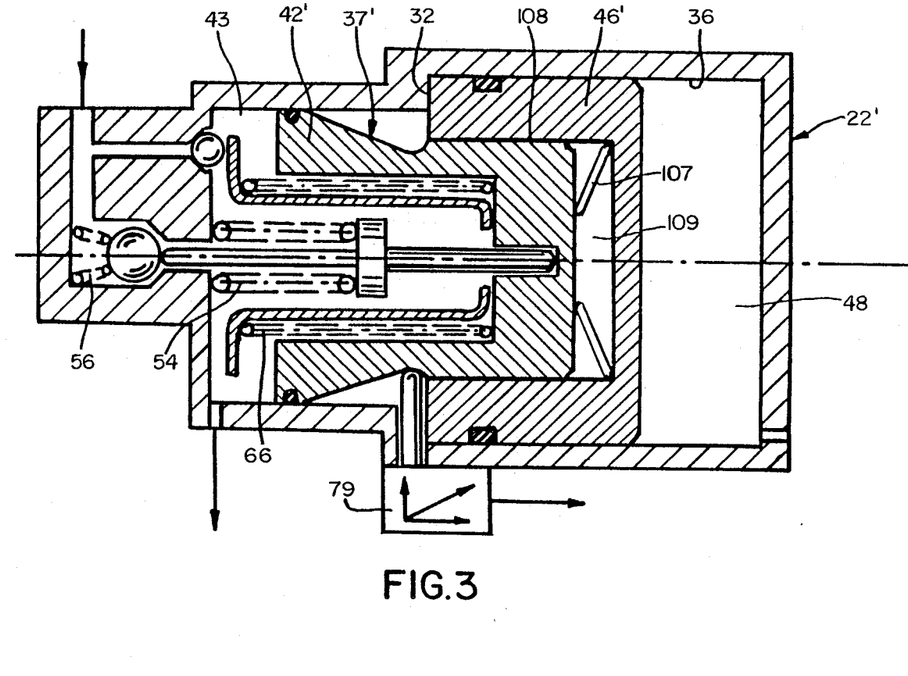
FIG. 3 is a cross-sectional view of another embodiment of a pressure regulation for an antilock system corresponding to FIG. 1 according to the invention with a device for monitoring the pressure in the driving pressure space of the pressure modulator.
Figure 4:
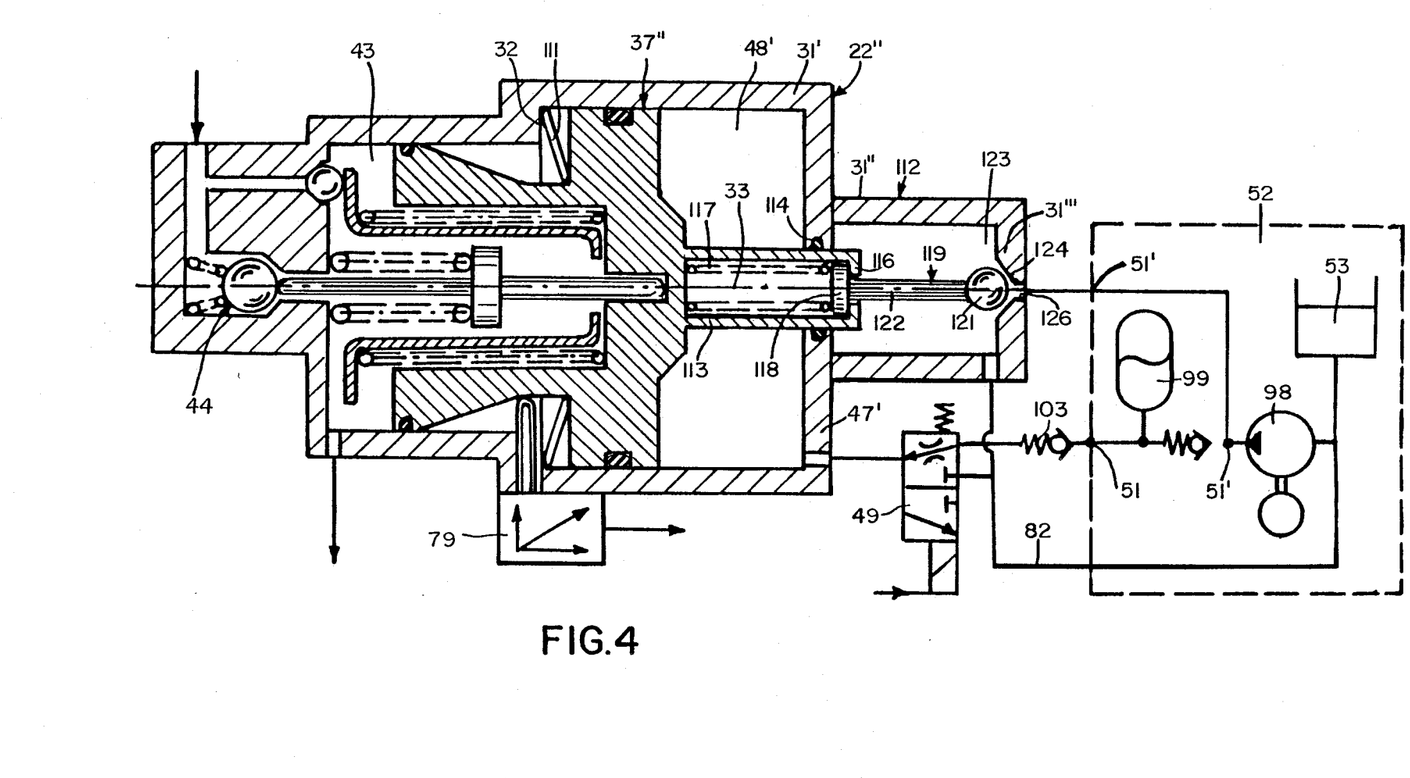
FIG. 4 is a representation that corresponds to FIGS. 1 and 3 of an embodiment of an antilock system according to the invention with a device that is an alternative to the device according to FIG. 3 for the monitoring of the pressure in the output pressure space of the pressure modulator as well as of a special design of the auxiliary pressure source.

In the case of the special embodiments of the antilock system 10 according to the invention shown in FIG. 1 and also in FIGS. 3 and 4, its characteristics are implemented within the framework of the front axle brake circuit I without limiting its general aspects.

Accordingly, a pressure modulator 22 is provided as the central operating element of the part of the antilock system 10 acting at the front axle, by which, in the course of an antilock control cycle taking place at wheel brake(s) 11 and/or 12 of the front axle brake circuit, brake pressure reduction and brake pressure buildup phases can be controlled.

The pressure modulator 22 is connected between the output 23 of the primary output pressure space 18 of the brake unit 14 and the master brake line 24 of the front axle brake circuit I at the branching point 26. The brake line 24 branches out into the brake line branches 26' and 26'' leading to the front wheel brakes 11 and 12.

One brake pressure control valve 27 or 28 respectively is assigned to the wheel brakes 11 and 12. The brake pressure control valve 27 or 28 can be switched from its shown initial 0 position—a flow-through position—, in which brake pressure can be built up or reduced at the respective connected wheel brake 11 or 12, into a blocking position I, in which the respective brake line branch 26' or 26'' is blocked with respect to the pressure modulator 22 and the brake pressure that was previously directed into the wheel brake 11 or 12 is maintained. In the case of the shown special embodiment, the brake pressure control valves 27 and 28 are shown as two-/two-way magnetic valves that can be controlled by output signals electronic control unit 29 of the antilock system, that is shown only in diagram form, in a sequence and combination that is appropriate for the control. In which case, it is a prerequisite that this electronic control unit 29 generates these control output signals from a processing taking place according to known criteria of output signals that are characteristic of the moving condition of the vehicle wheels and that are generated by wheel speed sensors that for reasons of simplicity are not shown.

The pressure modulator 22 is shown as a step cylinder. The housing 31 has two bore steps 34 and 36 of different diameters that, via a radial step 32, are connected to one another and are coaxial with respect to the central longitudinal axis 33 of the housing 31. A correspondingly stepped modulator piston 37 is sealed with bores 34 and 36 by ring seal 38 or 39 respectively that is fixed at the piston.

One end face wall 41 of the modulator housing 31 that is on the left in FIG. 1 and the smaller piston step 42 of the modulator piston 37 define an operational space of the pressure modulator in axial direction that in the following will be called a primary chamber 43. A centrally arranged intake valve 44 connects one side of primary chamber 43 and the primary pressure output 23 of the brake unit 14. The other side of primary chamber 43 is continuously in communicating connection with the master brake line 24 of the front axle brake circuit I. The larger, flange-shaped step 46 of the modulator piston 37 and the end face wall 47 of the modulator housing 31 that is opposite it, within its larger bore step 36, define a driving pressure space 48 that can be connected via an antilock system control valve 49 alternately to the output 51, that is maintained at a high pressure level, of an auxiliary hydraulic pressure source 52, or can be released in the direction of its unpressurized storage reservoir 53.

The antilock system control valve 49 is shown as a 2/3-way magnetic valve that can be controlled by output signals of the electronic control unit 29 from its initial 0 position, in which the driving pressure space 48 is connected to the high-pressure output 51 of the auxiliary pressure source 52 and is blocked with respect to its tank 53, into its excited I position, in which the driving pressure space 48 is blocked with respect to the high pressure output 51 and instead is connected to the tank 53 of the auxiliary pressure source 52. The high output pressure of the auxiliary pressure source 52 that is fed into the driving pressure space 48 in the initial 0 position of the control valve 49 forces the modulator piston 37, against the effect of a return spring 54, into its shown initial position associated with the minimum volume of the primary chamber 43.

The intake valve 44 of the pressure modulator 22 is shown as a ball valve. The ball is loaded in the direction of its conical valve seat 57 by a valve spring 56 unfolding as a result of a low restoring force. The valve seat 57 surrounds, on the input side, the valve bore 58 leading into the primary chamber 43.

In the shown initial position of the modulator piston 37, the ball of the intake valve 44 is lifted off its valve seat 57 by an elongated rod-shaped tappet 59 that, on the side of the piston, supports itself at the bottom of a pocket bore 61 of the modulator piston that centers it, and as a result, the intake valve 44 is held in its open position.

The tappet 59 include a radial supporting flange 62 that forms the support on the piston side of the restoring spring 54 that generates the main amount of the restoring force against which the modulator piston 37 is forced into the shown initial position. The restoring spring 54, that coaxially surrounds the valve-side portion of the tappet 59, supports itself directly at the interior surface area of the end face wall 41 of the housing 31 that surrounds the mouth of the valve bore 58 at the primary chamber 43.

The modulator piston 37, at the side that defines the primary chamber 43, is provided with an axial, cylindrically drop-shaped indentation 63 which represents an axial expansion of the primary chamber 43. The pocket bore 61, that centers the tappet 59, starts centrally from the bottom 64 of the indentation 63. In the radially outer area of the bottom 64, in the indentation 63 on the side of the piston, an elongated valve-closing spring 66 is supported that is under moderate pretension, i.e., under a clearly lower pretension than the restoring spring 54. This valve-closing spring 66 forces a valve-closing element 67 against a valve ball 68 and as a result pushes this valve ball 68 to a seal against a conical valve seat 69. A bypass duct 72 in valve seat 69 leads into the primary chamber 43 of the pressure modulator 22 that communicates with the input duct 71 of the pressure modulator 22.

The valve-closing element 67, as shown in detail in FIG. 1, is shown as an essentially cylindrically pot-shaped sleeve. The bottom 73 of valve-closing element 67 extends between the supporting flange 62 of the tappet 59 and the bottom 64 of the indentation 63 of the piston, and has a central opening 74 through which passes a portion of the tappet 59 with a play that is sufficient for the movability of the valve-closing element 67 with respect to the tappet 59. A radial flange 76 is connected to the sleeve jacket 75 and extends, seen in radial direction, between the restoring springs 54 toward outer bore 34. The flange 76 of the closing element 67 is forced against the valve ball 68 of the bypass valve 68, 69 by spring 66.

In the shown initial position of the modulator piston 37, the axial distance h of the supporting flange 62 of the tappet 59 from the interior surface of the bottom 73 is somewhat, for example, 5% to 10% less than the maximum stroke H that the modulator piston 37 can carry out between its shown initial position and its other end position that is marked by the stop against the end face wall 47. When the modulator piston 37 is brought into this end position, the supporting flange 62 of the tappet 59 acts as a driving flange that lifts the closing element 67 off the ball 68 of the bypass valve 68, 69. As a result, the bypass that leads from the brake unit 14 to the wheel brakes 11, 12, via the bypass duct 72 and the primary chamber 43 opens up, for a brake pressure buildup. In this end position of the modulator piston 37, the tappet 59 has lifted off of the ball of the intake valve 44 and the intake valve 44 is closed.

On a central portion between the portions of the smaller Piston step 42 and the larger piston step 46, sealed to the bores 34 and 36 of the housing, the modulator piston 37 has a shell surface 77 that tapers conically in the direction to the larger piston step 36. An actuating pin 78 of a path or position indicator 79 rides on the shell surface 77 and moves in a radial direction. This path or position indicator 79 generates an output signal that varies constantly with the deflections of the modulator piston 37 and is characteristic of the respective piston position. This output signal is also fed to the electronic control unit 29 of the antilock system as an information input. The position input can be used to determine breakdown of the auxiliary pressure source and differentiated to measure pressure reduction speed.

In diagrammatically simplified representation of FIG. 1, the pressure modulator 22, compared with the brake unit 14, is shown in a much larger scale. In practice, the brake unit 14 and the pressure modulator 22 are dimensioned in such a way that the volume enlargement $\Delta V$, of the primary chamber 43, when the modulator piston 37 moves from its initial position until its rests against the end face wall of the modulator housing 31, is much smaller than the volume $V_{Bmax}$ of the amount of brake fluid that can be forced from the primary output pressure space 18 of the brake unit 14 into the front axle brake circuit I when the brake unit 14 is actuated with the maximally possible pedal force. In which case an advantageous dimensioning relationship can be obtained by the relation:

$$0.25 \leq \Delta V / V_{Bmax} \leq 0.5 \quad (1a)$$

and preferably by the relation:

$$\Delta V / V_{Bmax} \leq \tfrac{1}{3} \quad (1b)$$

In addition, the effective piston surfaces $F_1$ and $F_2$ of the smaller step 42 or of the larger piston step 46 of the modulator piston 37, the minimum output pressure level $P_{min}$ of the auxiliary pressure source 52, the maximum brake pressure $P_{max}$ fed into the primary chamber 43 of the pressure modulator 22 or into the front axle circuit I by actuating the brake unit 14, the restoring spring 54, and the valve springs 56 and 66 are coordinated with one another in such a way that, in the shown initial position of the modulator piston 37, in which these springs 54, 56 and 66 unfold their largest possible restoring forces $F_{Rmax}$ (restoring spring 54), $f_E$ (valve-closing spring 56) and $f_{By}$ (bypass valve-closing spring 66), the following relations are met:

$$F_{Rmax} + f_E + f_{By} + P_{max} \cdot F_1 + \Delta F \leq P_{min} \cdot F_2 \quad (2a)$$

$$F_2 \text{ with } F_{Rmax} >> f_E + f_{By} \quad (2b)$$

and $0.2 \times P_{max} \cdot F_1 \leq F_{Rmax} \leq 0.4 \cdot P_{max} \cdot F_1 \quad (2c)$ In which case in the relation (2a), $\Delta F$ is a "safety margin", the advantage amount of which is provided by the relation $$0.1 \, P_{min} \cdot F_2 \leq \Delta F \leq 0.2 \cdot P_{min} \cdot F_2$$

A realistic design of the restoring spring 54 that meets the requirements of relation (2b) and that generates the predominant part of the elastic restoring force affecting the modulator piston 37, in this case, may correspond to the following relation:

$$8 \cdot (f_E + f_{By}) \leq F_{Rmax} \leq 9.5 \cdot (f_E + f_B) \quad (2b')$$

Figure 2:
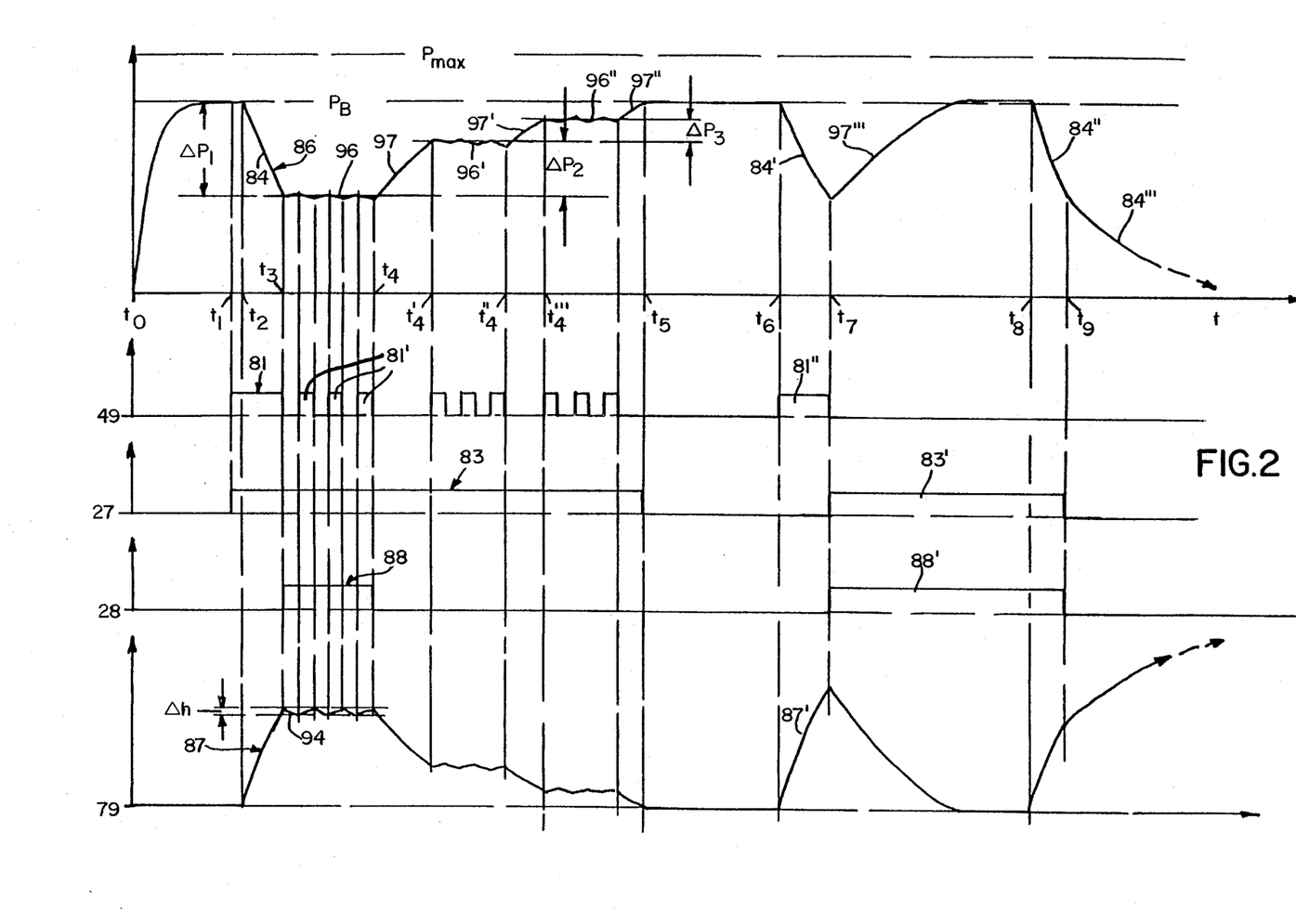
FIG. 2 is a diagram for the purpose of explaining the operation of the antilock system according to FIG. 1.

The antilock system 10 that so far has been explained structurally will now be explained functionally with reference to FIG. 2 by an example of a simple control cycle. It is understood that not all variation possibilities of the control algorithms can be discussed that may apply to the antilock system according to the invention and that, according to the axle load distribution of the vehicle, the conception of its drive line and of its purpose and other aspects that are relevant for the conception of an antilock system, may appear to be advantageous.

In a normal braking situation—that is not subjected to a control—, as well as in the unbraked driving operation, the brake pressure control valves 27 and 28 are maintained in their initial flow-through 0 position. The antilock system control valve 49 is also in its initial 0 position, in which the driving pressure space 48 of the pressure modulator 22 is acted upon by the output pressure of the auxiliary pressure source 52. The pressure modulator piston 37 is also in its initial position with the minimum volume of the primary chamber 43. In the case of a normal braking—as a result of the design of the pressure modulator 22 according to relation (2a)—it remains in this initial position, even if, in the case of this braking, a very high brake pressure is directed into the wheel brakes 11 and 12 of the front axle brake circuit I.

Let it be assumed that the vehicle, at a point in time $t_O$, is moving along on a road area with a high adhesion coefficient ($\mu = 1$) between the road and the vehicle wheels, and that at this point in time, a braking starts. A brake pressure is directed into brake circuits I and II that corresponds to 80% of the maximally achievable brake pressure. In the course of this braking, the vehicle reaches a road area with different adhesion coefficients between the road and the individual vehicle wheels. Where the adhesion coefficient at the right vehicle side is less than at the left side, a locking tendency occurs at the right front wheel that leads to a response of the antilock system. The electronic control unit 29 will then emit a first output signal 81 to control the antilock system control valve 49 into its excited position I in which the driving pressure space 48 is connected with a return line 82 that leads to the unpressurized storage reservoir 53 of the auxiliary pressure source 52. A second output signal 83 controls the brake pressure control valve 27 of the wheel brake 11 of the left front wheel that has no tendency to lock into its blocking position—the pressure maintenance position.

Starting from the point in time $t_1$, the modulator piston 37 moves toward its outer end position, which is expressed in a rising output signal of the path indicator 79. After a short initial portion of the stroke of the modulator piston 37, the intake valve 44 closes at the point in time $t_2$. Subsequently, a further shifting of the modulator piston 37 in the direction of its outer end position—because of the enlargement of the volume of the primary chamber 43—results in a lowering of the brake pressure in the wheel brake 12 of the right front wheel that has the tendency to lock. The qualitative course of which is indicated by the dropping branch 84 of the P/t curve 86 of FIG. 2. In this initiating phase of an antilock control cycle, the brake pressure reduction takes place very rapidly because the modulator piston, at its smaller piston step 42 is subjected to the still relatively high pressure in the primary chamber 43, and the pretensioning of the restoring spring 54 is still relatively high. The change of the output signal 87 of the path indicator 79 is relatively "steep".

It is assumed that at the point in time $t_3$, the vehicle wheel that tends to lock has "recovered" so far that its deceleration corresponds to that of the other vehicle wheels. The brake pressure control valve 28 of this wheel is now directed into its blocking position I by an output signal 88 of the electronic control unit. At the same time, the control of the antilock system control valve 49 is canceled which, as a result, falls back into its initial 0 position, in which pressure is built up again in the driving pressure space 47 of the pressure modulator.

The intake duct 91 of the antilock system control valve 49 is equipped with a throttle 92, whereby a limiting of the pressure rising speed is achieved in the driving pressure space 48 of the modulator 22. The pressure modulator piston 37 starts to move back into the direction of the arrow 93 into its initial position, as indicated by the first dropping branch 94 of the path indicator output signal 87. After the output signal has dropped off by an amount that corresponds to a small portion $\Delta h$ of the withdrawal stroke of the piston 37, the antilock system control valve 49 is controlled back into its excited position I—its pressure reduction position. This is indicated by the pulse-shaped output signal 81' of FIG. 2, whereby the piston 37 moves back into the direction of the arrow 94. This pulse-shaped control of the antilock system control valve 49, if necessary, is repeated several times within the pressure maintenance phase at the wheel brake 12 that is subjected to the control.

By this timed control of the antilock system control valve 49, the pressure in the primary chamber 43, at least on the average with respect to time, corresponds to that brake pressure at which the wheel brake 12 was maintained by the blocking of the brake pressure control valve 28. The curve 86 of the pressure in the primary chamber 43, during the pressure maintenance phase controlled in this way, at the controlled wheel brake 12 is indicated by the slightly "wavy" portion 96 of the curve 86 that is horizontal on the average.

If the monitoring of the moving behavior of the vehicle wheels indicates that a locking tendency no longer exists, the control of the antilock system control valve 49 is canceled and at the same time also that of the brake pressure control valve 28. At the point in time $t_4$, brake pressure is built up again, starting from the brake pressure that was previously maintained constant with respect to an average of time in the wheel brake 12 and in the primary chamber 43 of the Pressure modulator, as indicated by the first rising branch 97 of the P/t curve 86. In the first pressure buildup phase of curve branch 97 that follows the pressure maintenance phase of curve portion 96, pressure buildup speed is limited to a value that is lower than the pressure buildup speed that is possible in a normal braking phase by the throttle 92 of the antilock system control valve 49. The brake pressure is, however, not increased again by the full value $\Delta P_1$ by which it had previously been lowered, but by a lower value $\Delta P_2$, that is indicated as a function $f(\Delta P_1)$ of the previously occurred pressure reduction, for example, according to the relation $$\Delta P_2 = C \cdot \Delta P_1 \quad \text{(3a)}$$

with $$0.6 \leq C \leq 0.8 \quad \text{(3b)}$$

The proportional action factor c may be a function of the pressure reduction $P_1$, for example, according to the relation $$C = c_0 \left( 1 - \gamma \cdot \frac{\Delta P_1}{\Delta P_{max}} \right) \quad \text{(3c)}$$

wherein $c_o$ is a constant with the value 0.8, and $\gamma$ is a constant with the value 0.3, resulting in the variation range of factor c indicated by relation (3b).

By a variation of the pressure rise according to relation (3c), it is easier to increase the brake pressure again to almost the adjusted value for a relatively low pressure reduction $\Delta P_1$, than after a pressure reduction phase that has resulted in a drastic brake pressure reduction, which indicates that the adjusted brake pressure is much too high for the given braking situation. Therefore, a more moderate raising of the brake pressure will result more rapidly in a value that meets the control requirements and is compatible with a good directional and braking control. As soon as the pressure in the primary chamber 43 of the modulator 22 and thus also in the wheel brake 12 of the right front wheel has been increased by the amount $\Delta P_2$, which can be detected by the change of the output signal of the path indicator 79, and, as assumed, will occur in the point in time $t_4'$, another pressure maintenance phase takes place. Again output pulses 81' of the electronic control unit control the antilock system control valve 49 as shown in FIG. 2 by the second "wavy" portion 96' of the P/t curve 86.

When an examining of the dynamic behavior of the vehicle wheels indicates that the brake pressure, after the conclusion of the second pressure maintenance phase 96 at the point in time $t_4''$, may be increased further, a pressure buildup phase represented by another ascending branch 97' of the P/t curve 86 follows. The pressure is increased by the amount $\Delta P_3$ that clearly is lower than the amount $\Delta P_2$ of the first pressure increase and may, for example, be $0.1 \cdot \Delta P_1$. This pressure buildup phase ends at the point in time $t_4'''$. If the examination of the dynamic behavior of the vehicle wheels during the following pressure maintenance phase represented by the additional wavy portion 96'' of the P/t curve 86, determines that the brake pressure may be increased further, a final pressure build up phase represented by the additional ascending branch 97''' of the P/t curve 86 follows. The brake pressure is increased to the value $P_B$ that is set by the driver and that until then had been maintained also in the uncontrolled wheel brake 11 and is reached again in the point in time $t_5$.

As soon as the modulator piston 37 has reached its initial position again, or has arrived in the direct proximity of this initial position, which can be recognized by the output signal of the path indicator 79, the control of the brake pressure control valve 27 of the left front wheel is canceled again so that also its wheel brake 11 is again in a communicating way connected with the primary chamber 43 of the pressure modulator 22.

At the point in time $t_5$, at which the above-explained operating elements of the antilock system 10 again take up their initial positions, the control cycle at the right front wheel brake 12, that was selected for the purpose of an explanation, is concluded.

This control cycle—because of the dimensioning of the pressure modulator 22 according to the relation (1a) or (1b)—has not resulted in a reaction that is noticeable at the brake pedal 17 because the required pressure reduction at the wheel brake 12 would be achieved exclusively by the expanding or the reduction of the primary chamber volume.

By the rapid reduction of the brake pressure that is caused by the pretensioning of the spring 54 as well as by the instantaneously existing brake pressure, according to the descending branch 84 of the P/t curve 86 in the initiating pressure reduction phase of the control cycle, and by the pressure apportioning according to relation (3a) for the rebuilding of the brake pressure in the control phases of the antilock control, a very fast adjusting of the brake pressure to the respective most favorable value is achieved. A clear gain in brake deceleration as well as of directional control in comparison to the conventional antilock systems results In order to explain another typical course of an antilock system control cycle, it will now be assumed that the vehicle, in the course of the still occurring braking, reaches a road area with a very low adhesion coefficient ($\mu \approx 0.1$) at all vehicle wheels. In which case, the high brake pressure $P_B$ will still be set, and, starting at the point in time $t_6$, the brake pressure must be lowered in both front wheel brakes 11 and 12.

In this situation, first only the antilock system control valve 49 is controlled by pulse 81″ into its energized position I. In which position, the pressure in the driving pressure space 48 of the pressure modulator 22 can expand in the direction of the storage reservoir 53 of the auxiliary pressure source 52.

The pressure reduction in the primary chamber 43 and in the wheels brakes 11 and 12 is achieved by the withdrawal of the modulator piston 37 into the direct proximity of its extreme end position and that is represented by the descending branch 84′ of the P/t curve 86. In the braking situation that is assumed for the purpose of an explanation, this reduction is not sufficient for terminating the locking tendency of the vehicle wheels, because of the dimensioning of the pressure modulator according to relation (1b). Before the modulator piston 37 reaches its end position and opens the bypass valve 68, 69, the antilock system control valve 49, controlled by the output signal 87′ of the path indicator 79, is again switched back into its pressure buildup 0 position, by the descending flank of the control signal 81″ at $T_7$. At the same time, the two brake pressure control valves 27 and 28, by output signals 83′ and 88′ of the electronic control unit 29, are controlled into their pressure maintenance positions I. The shifting of the piston 37 of the pressure modulator 22 starting at the point in time $t_7$, in the direction of the arrow 93, will result in a relatively rapid pressure rise in the diminishing primary chamber 43 of the pressure modulator 22. This pressure rise is indicated qualitatively by the ascending branch 97‴ of the P/t curve 86. As soon as the pressure in the primary chamber 43 is larger by the equivalent closing pressure of the valve closing spring 56 of the intake valve 44 than the pressure in the primary output pressure space 18 of the brake unit 14, the hitherto closed intake valve 44 opens up, and brake fluid is forced back from the primary chamber 43 of the pressure modulator 22 into the primary output pressure space 18 of the brake unit 14.

In this phase of the control cycle, the pressure modulator 22 operates like a "recirculating pump". Also, the brake pedal 17 being pushed back in the direction of its initial position becomes noticeable and signals the actuating of the antilock control. Immediately before the piston 37 reaches the position, at the point in time $t_8$, at which the tappet 59 could start holding open the intake valve 44, the antilock system control valve 49, again controlled by the output signal of the path indicator 79, is directed back into its pressure reduction position I. The piston 37 again carries out its withdrawal stroke in the direction of the arrow 94 that ensues a volume enlargement of the primary chamber 43. The fast pressure reduction in the primary chamber 43 is indicated qualitatively by the descending branch 84″ of the P/t curve. After a short initial portion of this withdrawal stroke of the modulator piston 37, the two brake pressure control valves 27 and 28 are switched back into their initial 0 position at the point in time $t_9$ by the output signal of the path indicator 79. After which, the brake fluid can flow from the wheel brakes 11 and 12, into the further expanding primary chamber 43 of the modulator 22 for a further pressure reduction at those wheel brakes 11 and 12.

It is the purpose of this path-decelerated switching-over of the brake pressure control valves 27 and 28, to prevent the high pressure that is built up in the "recirculating operation" of the modulator 22 in its primary chamber 43, from being fed into the wheel brakes 11 and 12 before another pressure reduction can be achieved in the wheel brakes 11 and 12 by the withdrawal movement of the piston 37.

For the sake of simplicity of the explanation, it will be assumed that the pressure reduction in the primary chamber 43 and in the wheel brakes 11 and 12 connected to it that can be achieved by the additional withdrawal stroke of the primary piston and which is represented by the less descending branch 84‴ of the P/t curve 86, is sufficient for completely reducing the locking tendency at the front wheels, after which further control phases of the antilock control may take place in a way that is analogous to that explained above.

For reasons of completeness it should be mentioned that by the antilock system 10 according to the invention, a complete pressure reduction to 0 bar can be achieved in the wheel brakes 11 and 12, and in principle, the possibility also exists to generate a vacuum in the wheel brakes 11 and 12.

In order to explain further details of the antilock system 10, reference is made again to FIG. 1:

Within the auxiliary pressure source, a pressure accumulator 99 is provided that can be charged by a charge pump 98. The output pressure of this pressure accumulator 99 is limited to a maximum value by a pressure-controlled overflow valve 101 that is connected between the pressure output 51 of the auxiliary pressure source 52 and the return line 82. A check valve 105 is connected between the pressure accumulator 99 and the charge pump 98 that prevents a discharging of the Pressure accumulator 99 via the pump 98.

Between the pressure output 51 of the auxiliary pressure source 52 and the pressure supply connection 102 of the antilock system control valve 49, a safety check valve 103 is inserted. By a pressure that is higher in the driving pressure space 48 of the pressure modulator 22 than at the output 51 of the auxiliary pressure source 52, the safety check valve 103 is held in its blocking position. As a result, as long as the antilock control valve 49 takes up its 0 position, the safety check valve 103 prevents the pressure in the driving pressure space 48 of the pressure modulator 22 from expanding in the direction of this auxiliary pressure source 52 in the case of a breakdown of the auxiliary pressure source 52. As a result, in the case of a breakdown of the auxiliary pressure source 52, at least an excessive "giving-way" of the brake pedal 17 is prevented when the brake system is actuated.

The modulator piston 37, as a result of possibly further leakage losses caused by malfunctioning, deflects relatively slowly in the direction of its extreme end position. This malfunctioning is recognized by the output signal that is generated by the path indicator 79—"outside" a control phase of the antilock system—and is characteristic of a position change of the piston 37. Subsequently, the antilock system control valve 49 is directed into its pressure reduction position I so that the piston 37 reaches its extreme end position, in which case the bypass valve 68, 69 opens up. If this switching-over takes place during a braking process, this is first exhibited in an extending of the pedal path, in which case, however,—because of the limitation of the volume of the primary chamber 43 according to relation (1a) or (1b),—the brake system remains operable. After the piston 37 has reached its extreme end position, the mentioned extending of the pedal path will no longer occur. The output signal of the path indicator 79 that is generated permanently for the largest possible deflection of the piston is utilized as the malfunction-indicating signal.

In the drive circuit 48, 49, 52 of the antilock system 10, a conventional hydraulic oil may be used as the working medium because the annulus 104 that extends between the piston steps 42 and 46 sealed off with respect to the housing, that is delimited conically by the piston, and that can be kept under atmospheric pressure, provides an effective separation of media between the driving circuit and the brake circuit. As the accumulator charge pump 98, a pump that is permanently driven—preferably by the vehicle engine—can therefore be provided that is lubricated sufficiently by the working medium of the driving circuit. If, on the other hand, an electric driving motor 106 is provided for the accumulator charge pump 98 that is switched on only if necessary, i.e., when the accumulator pressure has fallen below a minimum threshold value, for the control of the driving motor 106 that meets the requirements, the output signal of the path indicator 79 can be utilized to generate a switching input, independently of the antilock control process when the modulator piston 37 moves out of its initial position. The path indicator 79, in this case, may be utilized as a pressure switch controlling the accumulator charging operation. In which case, the overflow valve 101 is not required and to that extent, a simplification of the construction of the auxiliary pressure source 52 is possible.

By—for example, a differentiating processing of the output signal of the path indicator 79, precise information can also be obtained concerning the moving speed of the modulator piston 37 in the pressure reduction and pressure buildup phases of the antilock control and can be utilized for its control. In particular, by a pulsed control of the antilock system control valve 49, the speed can be varied within wide limits by which the brake pressure is increased in a pressure buildup phase of the antilock control.

Two other embodiments of the antilock system according to the invention shown in FIGS. 3 and 4 will be explained, which essentially contain special developments of its pressure modulator. In FIGS. 1, 3 and 4, elements that are identical or analogous with respect to operation and function, use the same reference numbers so that to this extent reference can be made to the respective parts of the description of FIG. 1.

The pressure modulator 22' that is shown in FIG. 3, can be used with the same hydraulic connections as the pressure modulator 22 according to FIG. 1 within the scope of an antilock system 10 according to the invention.

The pressure modulator 22' according to FIG. 3 differs from the pressure modulator 22 according to FIG. 1 only in that its modulator piston 37' is developed in two parts, with two piston parts 42' and 46' that can be slid in axial direction with respect to one another. These two piston parts 42' and 46', are supported with respect to one another by a diaphragm spring 107 in the axial direction.

With the exception of the flange part 46' that seals off the modulator piston 37' with respect to the larger bore step 36, all parts that, with respect to construction and function, correspond to the piston 37 of the modulator 22 according to FIG. 1 or are applied to it, are arranged or supported at the piston part 42' that on one side defines the primary chamber 43 of the pressure modulator 22'.

The flange part 46', that is sealed off with respect to the larger bore step 36, is shown as a pot-shaped sleeve. At the interior circular-cylindrical shell surface 108 of flange part 46', the piston part 42' is guided, on the side of the primary chamber, with its cylindrical end portion. The outside diameter of it's cylindrical end portion is approximately identical to the minimal diameter of the conically tapering portion of the piston part 42'. The diaphragm spring 107 is arranged in the interior flat circular-disk-shaped space 109 that is defined by the two piston parts 42' and 46'.

The diaphragm spring 107 is dimensioned in such a way that, within its possible spring excursion, it can generate a restoring force that corresponds to the maximum value $P_{max}$ of the brake pressure that can be fed into the primary chamber 43 of the pressure modulator 22' or into the brake circuit I by the brake unit 14. In the shown initial position of the piston 37', the pretensioning of the diaphragm spring 107 corresponds to the sum of the restoring forces that, in this initial position, are generated by the restoring spring 54 and the valve closing springs 56 and 66. Otherwise, the pressure modulator 22' is also designed according to the dimensioning relations (1a) to (2d) explained for the pressure modulator 22. This means that as long as the output pressure of the auxiliary pressure source 52 is fed into the driving pressure space 48, the piston part 46', that is larger with respect to its diameter, is held in a position in which it rests against the housing step 32. In the case of a braking, the piston part 42' that defines the primary chamber 43, under the influence of the brake pressure fed into the primary chamber 43, is subjected to a shifting against the restoring force of the diaphragm spring 107 that increases with the pressure. The output signal of the path indicator 79 that changes monotonically with the shifting of the piston part 42' therefore represents a direct measurement of the pressure existing in the primary chamber 43. Since the brake pressure existing at the start of the antilock control represents a measurement of the adhesion coefficient between the road and the vehicle wheel that is to be subjected to the control, the output signal of the path indicator provided in combination with the pressure modulator 22', in a particularly advantageous way, can be utilized for an adequate control of the antilock control phases.

FIG. 4, to the details of which reference is made, shows another pressure modulator 22'' that can be used within the scope of an antilock system 10 and that represents an alternative to the above explained design of the pressure modulator 22'. Pressure modulator 22'', with respect to construction and function, corresponds largely to the pressure modulator 22 according to FIG. 1 and differs from it in that the one piece modulator piston 37'' can be supported at the housing step 32 by a diaphragm spring 111. Also, at the side of the modulator piston 37' that faces the driving pressure space 48', as well as at its housing 31', additional operating elements 112 are provided by which a path-controlled overflow valve can be obtained and that can be used instead of a separate overflow valve 101, as shown in FIG. 1, and is integrated into the pressure modulator 22''.

Pressure modulator 22'' also is designed according to relations (1a) to (2d).

As a result of the elastic support of the modulator piston 37'' at the housing 36' by the diaphragm spring 111, the output signal of the path indicator 79, at least as long the brake system is not actuated, represents a direct measurement of the pressure existing in the driving pressure space 48'. The diaphragm spring 111 is designed such that, within its spring excursion, it can generate a maximum restoring force, that is equal to the force that can be achieved by the admission of the maximum output pressure of the auxiliary pressure source 52 to the driving pressure space 48' and that pushes the modulator piston 37'' into its initial position that is connected with the minimum volume of the primary chamber 43.

For the implementation of the overflow valve 112, the following constructive additions were made at the modulator 22'' according to FIG. 4, compared to the modulator 22 according to FIG. 1:

The modulator piston 37'' has a slender, hollow-tube-shaped shaft 113 that axially penetrates the driving pressure space 48', is coaxial with respect to the longitudinal shaft 33 of the pressure modulator 22'', passes through a central bore of the end face wall 47' of the modulator housing 31' and, is sealed with respect to this housing by a ring seal 114 fixed at the housing. At its extreme end, the shaft 113 has a ring-shaped stop flange 116 that projects radially toward the inside and against which, a flange-shaped stop piece 118 of a valve body 119 of the overflow valve 112 is pushed by a pretensioned restoring spring 117 on the inside of the shaft. As the valve closing element, this valve body 119 has a valve ball 121 that, by a tappet-shaped connecting element 122 that passes through the central opening of the stop flange 116, is connected with the flange-shapes stop piece 118 of the valve body 119.

The end portion of the shaft 113 that penetrates through the end face wall 47' of the modulator housing 31' projects a short distance into a housing part 31'' that itself is pot-shaped and is attached on the outside to the modulator housing 31'. This housing part 31'' defines a valve chamber 123 that is constantly in communicating connection with the return line leading to the storage reservoir 53 of the auxiliary pressure source 52. The wall of the valve chamber 123 that is formed by the floor 31''' of the pot-shaped housing part 31'' has a central connecting duct 126 that, via a conical valve seat 124, leads into the valve chamber 123 and to which the pressure output 51 of the accumulator charge pump 98 is directly connected.

In the shown initial position of the modulator piston 37'', the valve ball 121 is arranged at an axial distance from the valve seat 124 that corresponds to a small fraction of the possible stroke of the modulator piston 37''. As a result, the overflow valve 112 is held in its open position, in which the working medium of the driving circuit of the pressure modulator 22' is conveyed against a practically negligible flow resistance in the circulating system.

When the pressure in the driving pressure space 48' of the pressure modulator 22'' falls to an amount that is less than a threshold value that is sufficient for the "fixing" of the modulator piston 37'' in its initial position, the valve ball 121 engages and seals off the valve seat 124. The accumulator charge pump 98 will now operate again in the sense of a charging of the pressure accumulator or in the sense of a pressure increase in the driving pressure space 48'. As a result of the increases in the driving pressure space 48', the modulator piston 37'' is again pushed into its initial position that is connected with the open position of the overflow valve 112.

When the auxiliary pressure source 52 functions properly, the overflow valve 112 is, with respect to time, predominantly held in its open position. Thus the pressure medium of the driving circuit can be recirculated against, at best, a slight flow resistance so that an undesirable heating of the pressure medium and of the driving circuit is largely avoided.

Figure 5:
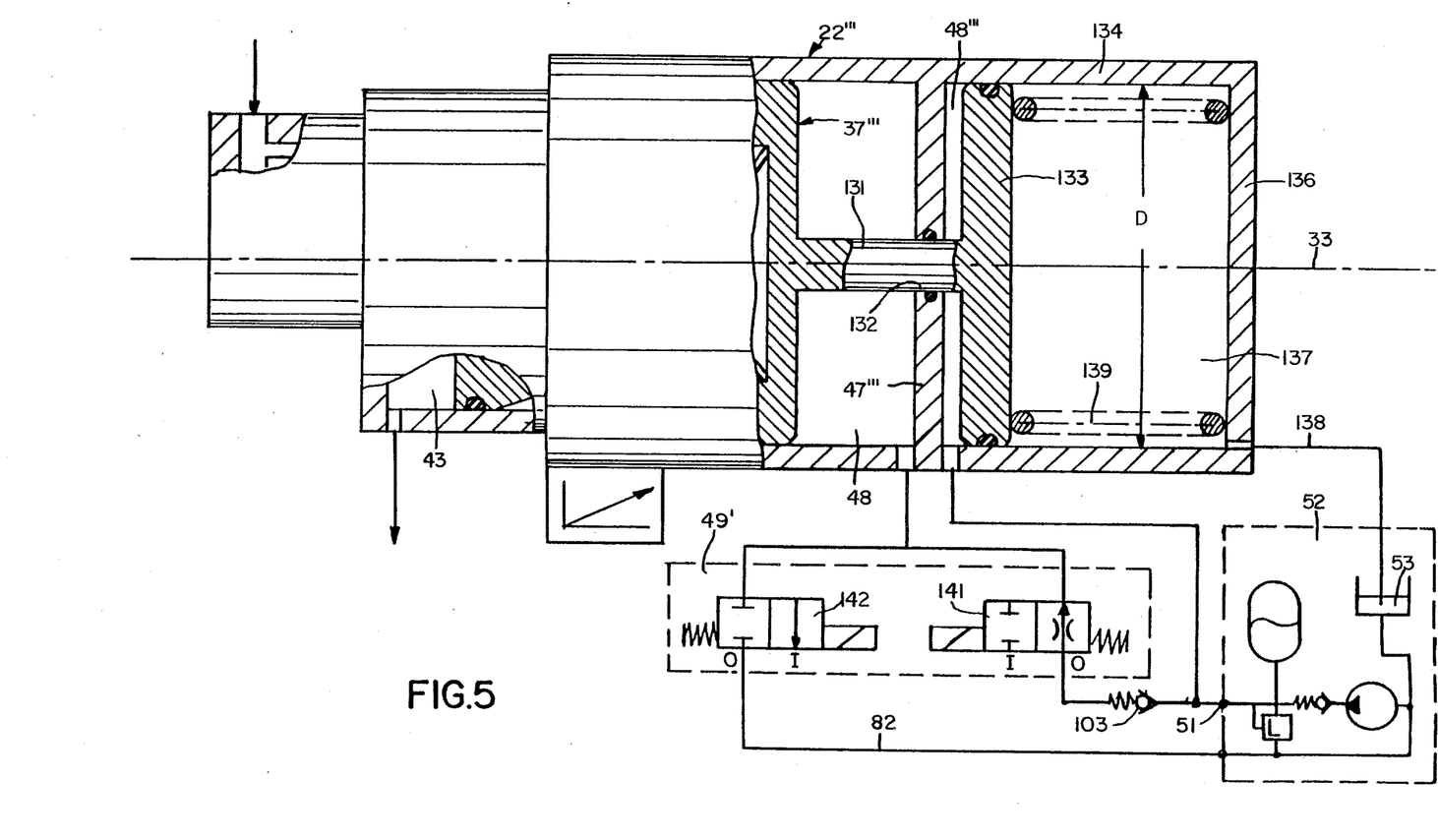
FIG. 5 is a representation that corresponds to FIGS. 1 and 3 or FIG. 3 of the pressure modulator and of the control valve arrangement provided for the control of pressure reduction and pressure buildup phases of the antilock control that may be used also in combination with the embodiments according to FIGS. 1, 3 and/or 4.

FIG. 5, illustrates another development of a pressure modulator 22''' that can be used within the scope of the antilock system 10 according to the invention is explained, as well as a magnetic valve arrangement 49 that can be used instead of a single antilock system control valve 49, in the case of all embodiments that were explained above.

To the extent that in FIG. 5 the same reference numbers were used as in FIGS. 1 and 3 this constitutes a reference to the respective parts of the description.

The piston 37''', that essentially may have the structure shown in FIG. 1 or in FIG. 3, is firmly connected with a piston flange 133 by a piston rod 131 that extends along the central longitudinal axis 33 and passes through a central bore 132 of and is sealed with respect to the partition 47''' fixed at the housing. The partition 47''' defines the driving pressure space 48 in axial direction. The piston flange 133 is slid, in a pressure-sealed way, in a pot-shaped extension part 134, the floor 136 of which forms the outer end face wall of the modulator housing.

The diameter D of this piston flange 133 corresponds to the diameter of the piston flange of the modulator piston 37''' that defines the driving pressure space 48.

The piston flange 133 arranged in the extension part 134 and the partition 47''' fixed at the housing, define a second driving pressure space 48''' inside the extension part 134. This driving pressure space 48''', in contrast to the driving pressure space 48, is connected permanently to the high pressure output 51 of the auxiliary pressure source 52. The space 137 that is defined in axial direction by the additional piston flange 133 and the floor 136 of the extension part 134 is kept in an unpressurized condition and, via an overflow oil discharge 138, is connected to the storage tank 53 of the auxiliary pressure source 52.

In the normal operation, i.e., when the antilock control has not responded and no malfunctioning of the auxiliary Pressure source 52 exists, the modulator piston 37''' is relieved from pressure because the driving pressure space 48 as well as the driving pressure space 48''' in this operating condition are acted upon by the high output pressure of the auxiliary pressure source 52. In order to keep the modulator piston 37''' in this operating condition in its initial position with the minimum volume of the primary chamber 43, a pressure spring 139 is arranged in space 137 of the extension part 134. This pressure spring 139 is applied to the additional piston flange 133 and supports itself at the floor 136 of the extension part 134. The pretensioning of this pressure spring 139 is proportioned such that it can hold the modulator piston 37''' in its initial position against the effect of the restoring springs that are also applied to it as well as of the maximum pressure that can be fed into the primary chamber 43 by actuating the brake unit.

In the pressure reduction phases of the antilock control, the driving pressure space 48 of the pressure modulator 22''', via the valve arrangement 49', is connected to the return line 82 that leads to the unpressurized storage tank 53, and only the second driving pressure space 48''' is connected to the high pressure output 51 of the auxiliary pressure source 52. The modulator piston 37''', by the effect of the pressure fed into this second driving pressure space 48''' on the additional piston flange 133, is shifted against the increasing restoring force of the pressure spring 139 in the direction of its extreme end position. In pressure buildup phases, during which the piston 37''' is relieved from pressure by the directing of the output pressure of the auxiliary pressure source 52 into both driving pressure spaces 48 and 48''', the shifting of the piston 37''' takes place in the sense of a diminishing of the primary chamber 43 of the pressure modulator 22''' by the pressure spring 139.

This pressure modulator 22''' has the advantage that, when the auxiliary pressure source 52 breaks down, no extension of the pedal path will occur, because the piston 37''' in this case is permanently held in its initial position by the pressure spring 139.

The valve arrangement 49' that controls the antilock control operation comprises a first 2/2-way magnetic valve 141 for the control of the pressure buildup in the driving pressure space 48 and a second 2/2-way magnetic valve 142 for the control of the pressure reduction in the driving pressure space 48 of the pressure modulator 22'''. The initial 0 position of the pressure buildup control valve 141 is the flow-through position in which the driving pressure space 48, via the valve 141 and the check valve 103 that is inserted between this valve 141 and the high pressure output 51 of the auxiliary pressure source 52, is connected to it. Its energized position I is the blocking position.

The initial 0 position of the pressure reduction control valve 142 is its blocking position in which the driving pressure space 48 is blocked off with respect to the return line 82. Its energized position I is the flow-through position in which the driving pressure space 48, via the return line 82, is connected with the storage tank 53 of the auxiliary pressure source. The magnetic valve arrangement 49' has the advantage that the piston 37''' of the pressure modulator 22''' can be stopped by the sole switching-over of the pressure buildup control valve 141 into its blocking position I, which is expedient when both wheel brakes that are connected to the primary chamber 43 of the pressure modulator 22''' are subjected to a pressure maintenance phase of the antilock control. The modification of the electronic control unit 29 of the antilock system 10 that is required for this purpose can be carried out without difficulty by an expert who is familiar with the control purpose.

The above-explained operational advantage of the valve arrangement 49' in comparison to a 3/2 magnetic valve 49, as explained for FIG. 1, could also be achieved by a 3-position valve which has a blocking position between the operational positions 0 and I of the 3/2-way magnetic valve 49, in which the pressure space 48 is blocked with respect to the auxiliary pressure source 52 as well as with respect to the return line 82. The "opened-up" construction of the valve arrangement 49' provided according to FIG. 5, in contrast, can be implemented with considerably less technical expenditures.

The antilock system 10 according to the invention, in situations in which the antilock control starts at a high brake pressure as well as—owing to the dimensioning of the restoring spring 54 according to relation (1b)—in cases in which the control starts at a low brake pressure, results in advantageously low control cycle durations that clearly are shorter than the cycle durations required in the case of an antilock system that operates according to the conventional recirculating principle. In addition, control phases that result in reactive effects on the brake pedal that, although they are desirable for recognizing the response of the antilock control, diminish the driving comfort, and are limited to "extreme" braking situations.

It is understood that an antilock system according to the invention may also be developed to the extent that a separate pressure modulator is assigned to each of the wheel brakes 11 and 12 that can be subjected to the control so that within one control cycle, brake pressure can be reduced at one wheel brake, and at the same time, pressure can be reduced at the other wheel brake.

Although the present invention has been described and illustrated in detail, it is to be clearly understood that the same is by way of illustration and example only and is not to be taken by way of limitation. The spirit and scope of the invention are to be limited only by the terms of the appended claims.

I claim:

1. An antilock system for a road vehicle having a hydraulic multiple circuit brake system; having at least one static brake circuit; a brake unit; a wheel brake cylinder which is acted upon by a pressure that is generated in an output pressure space of a brake unit and which is proportional to a brake actuating force; a pressure modulator means for controlling pressure reduction and pressure buildup phases of an antilock brake control; said pressure modulator means having a step piston means for displacement in a housing and with two piston steps of different sized diameters with one being smaller than the other, the smaller diameter piston step delimiting a primary chamber and the larger diameter piston step delimiting a driving pressure space; the wheel brake cylinder being connected to said primary chamber of the pressure modulator means; a control valve means, in alternative opening positions, connecting the driving pressure space either with a high pressure output of an auxiliary pressure source for forcing the step piston into its initial position corresponding to the minimum volume of the primary chamber, or with an unpressurized storage reservoir of the auxiliary pressure source for displacing the step piston to enlarge the volume of the primary chamber and reduce the pressure in the connected brake circuit; an intake valve means connecting the output pressure space of the brake unit with the primary chamber of the pressure modulator means during normal braking operation and blocking off the output pressure space of the brake unit with respect to the primary chamber of the pressure modulator means as a result of pressure removal from the driving pressure space during activation of the antilock control; output signals of an electronic antilock system control unit means for moving said control valve means into alternative operating positions required for pressure reduction and pressure buildup phases of the antilock control; the pressure modulator means also including at least one restoring spring means for bringing the step piston means into an end position corresponding to a maximum volume of the primary chamber and minimum pretensioned condition of the restoring spring means; and wherein the primary chamber is sized such that a maximum volume enlargement of the primary chamber is achieved by the shifting of the step piston means from its initial to its end position and is smaller than a volume of brake fluid that is displaced at maximum brake pressure into the wheel brake cylinder connected to the pressure modulator means;

wherein the maximum change of the volume of the primary chamber resulting from a shifting of the step piston between its initial and end positions amounts to between 25% and 50% of the maximum brake fluid volume that is displaced into the brake circuit that is subjected to the antilock control; and wherein the brake circuit includes brake line branches that are subjected to the antilock control and that lead from the primary chamber of the pressure modulator means to the connected wheel brakes; and a respective magnetic value means for each brake line branch that is controlled by output signals from the electronic antilock control unit means for alternatively or jointly blocking a respective brake line branch during a phase of an anti-skid control cycle in which brake fluid is displaced from the modulator means to the output pressure space of the brake unit.

2. An anitlock system according to claim 1 including a bypass valve means that is opened at an end position of the step pistion means that corresponds to approximately maximum volume of the primary chamber, to connect the output pressure space of the brake unit with the primary chamber of the pressure modulator means and is otherwise closed.

3. An antilock system according to claim 2, including a position indicator means having an output signal that indicates position of the stepped piston means; and wherein during a breaking that is not subjected to the antilock control and the output signal of the position indicator means indicates a shifting in the sense of a volume enlargement of the primary chamber, the antilock system control unit controls the control valve means into an energized position for volume enlargement for causing the step piston means to move to its end position in which the bypass valve means takes up an open position.

4. An antilock system according to claim 1, wherein the driving pressure space of the pressure modulator means is separated by a partition of the housing from a second driving pressure space, a piston flange means movably defining the second driving pressure space is firmly connected with the step piston means by a piston rod that passes through and is sealed off with respect to a bore of the partition; the second driving pressure space being permanently connected to the high pressure output of the auxiliary pressure source; a pretensioned pressure spring means that supports itself at an end face wall of the housing and is applied at the side of the piston flange means that faces away from the second driving pressure space; and wherein a pretensioning of said pressure spring means is sufficient for maintaining the step piston means against the restoring forces of the restoring spring means acting on said step piston means in the opposite direction and against the force that affects said piston in the sense of an enlargement of the primary chamber volume when the primary chamber is acted upon by a brake pressure $p_{max}$ that is maximally generated by the brake unit, in the initial position that corresponds to the minimum volume of the primary chamber.

5. An antilock system according to claim 1, including a position indicator means for emitting an electrical position indicating signal that is characteristic of the position of the piston.

6. An antilock system according to claim 5, wherein the step piston means, between a sealing flange on the side of the primary chamber and a sealing flange on the side of the driving pressure space, has a conical shell surface that tapers in axial direction and at which an actuating pin of the position indicator means supports itself radially, said position indicator means converting the radial shifting of the actuating pin into the position-indicating signal.

7. An antilock system according to claim 1, wherein the intake valve means of the pressure modulator means is a check valve that is acted upon in an opening direction by the pressure in the primary chamber that is higher than the pressure in the output pressure space of the brake unit.

8. An antilock system according to claim 1, including a check valve means connected between the high pressure supply connection of the antilock system control valve means and the pressure output of the auxiliary pressure source when the antilock system control value means is in its initial position; the check valve means being moved in a blocking direction by a pressure that is higher in the driving pressure space of the pressure modulator means than at the output of the auxiliary pressure source.

9. An antilock system according to claim 1, wherein the step piston means of the pressure modulator means is supported with respect to the housing by a second restoring spring means, the restoring force of said second restoring spring being maximal in the step piston means position that corresponds to a minimal volume of the primary chamber and wherein the restraining force is reduced to a minimum with an increasing deflection of said step piston means from this minimal volume position, within a fraction of the total stroke of said step piston means.

10. An antilock system according to claim 9, wherein the second restoring spring means is a diaphragm spring that supports itself on one side at a housing step of the pressure modulator housing.

11. An antilock system according to claims 1, wherein the step piston means is in two parts; a first piston part delimiting the driving pressure space and supported at a housing step, and a second piston part delimiting the primary chamber on one side and supported at said first piston part by a second restoring spring means that over a short path is tensioned to a restoring force that is in equilibrium with a pressure force resulting from the admission of brake pressure to the primary chamber.

12. An antilock system according to claim 1, wherein said antilock system control unit controls said control valve means such that in a first pressure buildup phase of the antilock control that follows a pressure reduction phase in which brake pressure had been reduced by an amount $\Delta P_1$, or follows a pressure maintenance phase that comes after the pressure reduction phase, the brake pressure is increased by an amount $\Delta P_2$ that is a result of the relation $$\Delta P_2 = C \cdot \Delta P_1,$$

with $$0.5 \leq C \leq 0.8$$

13. An antilock system according to claim 12, wherein the proportional action factor c exists of the relation $$C = C_o \left(1 - \gamma \cdot \frac{\Delta P1}{P_{max}}\right).$$

wherein $c_o$ has the value 0.8, $\gamma$ has a value of 0.3 and $P_{max}$ is the brake pressure that maximally is fed into the wheel brakes.

14. An antilock system according to claim 12 including a position indicator means having output signals that are characteristic of the position of the step piston means of the pressure modulator and wherein the antilock system control unit detects the pressure reduction $\Delta P_1$ and generates the control signals required for the control of the pressure buildup by a processing of the output signals of the position indicator means.

15. An antilock system according to claim 1, wherein there is a throttle in the flow path that is open in the initial position of the antilock system control valve arrangement and leads from the auxiliary pressure source to the driving pressure space of the pressure modulator means.

16. An antilock system for a road vehicle having a hydraulic multiple circuit brake system; having at least one static brake circuit; a brake unit; a wheel brake cylinder which is acted upon by a pressure that is generated in an output pressure space of a brake unit and which is proportional to a brake actuating force; a pressure modulator means for controlling pressure reduction and pressure buildup phases of an antilock brake control; said pressure modulator means having a step piston means for displacement in a housing and with two piston steps of different sized diameters with one being smaller than the other, the smaller diameter piston step delimiting a primary chamber and the larger diameter piston step delimiting a driving pressure space; the wheel brake cylinder being connected to said primary chamber of the pressure modulator means; a control valve means, in alternative operating positions, connecting the driving pressure space either with a high pressure output of an auxiliary pressure source for forcing the step piston into its initial position corresponding to the minimum volume of the primary chamber, or with an unpressurized storage reservoir of the auxiliary pressure source for displacing the step piston to enlarge the volume of the primary chamber and reduce the pressure in the connected brake circuit; an intake valve means connecting the output pressure space of the brake unit with the primary chamber of the pressure modulator means during normal braking operation and blocking off the output pressure space of the brake unit with respect to the primary chamber of the pressure modulator means as a result of pressure removal from the driving pressure space during activating of the antilock control; output signals of an electronic antilock system control unit means for moving said control valve means unto alternative operating positions required for pressure reduction and pressure buildup phases of the antilock control; the pressure modulator means also including at least one restoring spring means for bringing the step piston means into an end position corresponding to a maximum volume of the primary chamber and minimum pretensioned condition of the restoring spring means; and wherein the primary chamber is sized such that a maximum volume enlargement of the primary chamber is achieved by the shifting of the step piston means from its initial to its end position and is smaller than a volume of brake fluid that is displaced at minimum brake pressure into the wheel brake cylinder connected to the pressure modulator means, wherein the maximum change of the volume of the primary chamber resulting from a shifting of the step piston between its initial and end positions amounts to between 25% and 50% of the maximum brake fluid volume that displaced into the brake circuit that is subjected to the antilock control including a bypass valve means that is opened at an end position of the step piston means that corresponds to approximately maximum volume of the primary chamber, to connect the output pressure space of the brake unit with the primary chamber of the pressure modulator means and is otherwise closed, a spring-loaded closing element means for forcing the bypass valve means into its closed blocking position; and a stop piece means moving along with the step piston means for separating the closing element from the bypass valve means and for moving the bypass valve means out of its closing position when the step position means approaches its end position.

17. An antilock system according to claim 16, including a pressure spring means supporting itself at the step piston means with a pretensioning which is less than that of the restoring spring means, for forcing the closing element means against a valve body of the bypass valve means and wherein the stop piece means includes a stop flange of a tappet that is held so that rests against the piston by the restoring spring means.

18. An antilock system according to claim 17, wherein the closing element means has a pot-shaped sleeve with a stop flange projecting radially outwardly to the valve body of the bypass valve means, a floor of the sleeve adjacent a side of the step piston means having a central opening through which a portion of the tappet passes, the stop flange being arranged at an axial distance from the floor of the sleeve that is 5 to 10% smaller than a maximum stroke of the piston.

19. An antilock system, for a road vehicle having a hydraulic multiple circuit brake system having at least one static brake circuit; a brake unit; a wheel brake cylinder which is acted upon by a pressure that is generated in an output pressure space of a brake unit and which is proportional to a brake actuating force; a pressure modulator means for controlling pressure reduction and pressure buildup phases of an antilock brake control; said pressure modulator means having a step piston means for displacement in a housing and with two piston steps of different sized diameters with one being smaller than the other, the smaller diameter piston step delimiting a primary chamber and the larger diameter piston step delimiting a driving pressure space; the wheel brake cylinder being connected to said primary chamber of the pressure modulator means; a control valve means, in alternative operating positions, connecting the driving pressure space either with a high pressure output of an auxiliary pressure source for forcing the step piston into its initial position corresponding to the minimum volume of the primary chamber, or with an unpressurized storage reservoir of the auxiliary pressure source for displacing the step piston to enlarge the volume of the primary chamber and reduce the pressure in the connetted brake circuit; an intake valve means connecting the output pressure space of the brake unit with the primary chamber of the pressure modulator means during normal braking operation and blocking off the output pressure space of the brake unit with respect to the primary chamber of the pressure modulator means as a result of pressure removal from the driving pressure space during activation of the antilock control; output signals of an electronic antilock system control unit means for moving said control valve means into alternative operating positions required for pressure reduction and pressure buildup phases of the antilock control; the pressure modulator means also including at least one restoring spring means for bringing the step piston means into an end position corresponding to a maximum volume of the primary chamber and minimum pretensioned condition of the restoring spring means; and wherein the primary chamber is sized such that a maximum volume enlargement of the primary chamber is achieved by the shifting of the step piston means from its initial to its end position and is smaller than a volume of brake fluid that is displaced at maximum brake pressure into the wheel brake cylinder connected to the pressure modulator means; wherein the auxiliary pressure source includes a pressure accumulator charged by a permanently driven pump, an overflow valve means for limiting the pressure in said accumulator and being actuated as a function of the position of the step piston means of the pressure modulator means the valve body of said overflow valve means in the step piston means position corresponding to the minimum volume of the primary chamber, being lifted off its seat and opening up a bypass flow path leading back from the output of the pump to its input; and wherein as soon as the step means has carried out a minimum stroke in the sense of a volume expansion of the primary chamber and reaches its closing position sealing off the valve seat, an increasing deflection of the step piston means causes said overflow valve means against the valve seat by a closing force that is proportional to said deflection.

20. An antilock system according to claim 19, wherein the pressure modulator step piston means includes a hollow-tube-shaped shaft that penetrates the driving pressure space in an axial direction and passes through and is sealed off with respect to a bore of an end face wall of the housing that defines the driving pressure space in the axial direction, said shaft projecting into a valve chamber that is attached to the housing and in communicating connection with the storage reservoir of the auxiliary pressure source; a seat of said overflow valve means is located on an end face wall of said valve chamber opposite said driving pressure space and connecting the valve chamber to the pressure output of the accumulator charge pump; said shaft having an outer end projecting into the valve chamber with a stop flange that projects radially inwardly; a stop piece of the overflow valve's body being pressed against said stop flange by a restoring spring in the interior of the shaft; the overflow valve body including a valve ball closing element connected with the stop piece by a connecting element that penetrates through the central opening of the stop flange; and wherein said valve ball, in the initial position of the modulator step piston means corresponding to the minimum volume of the primary chamber, being held at an axial distance from the valve seat that step corresponds to a small fraction of the possible stroke of the modulator means piston.

* * * * *